UNITED STATES PATENT OFFICE.

PAUL FRIEDLAENDER, OF OFFENBACH-ON-THE-MAIN, GERMANY, ASSIGNOR TO K. OEHLER, OF SAME PLACE.

COMBINATION OF TETRAZODIPHENYL CHLORIDE WITH RESORCIN.

SPECIFICATION forming part of Letters Patent No. 361,404, dated April 19, 1887.

Application filed November 19, 1886. Serial No. 219,405. (Specimens.)

*To all whom it may concern:*

Be it known that I, PAUL FRIEDLAENDER, doctor of philosophy, a subject of the Emperor of Germany, and residing at Offenbach-on-the-Main, Germany, have invented new and useful Improvements in Coloring-Matter, of which the following is a specification.

The red coloring-matters to which my invention relates belong to the class of the so-called "azo" compounds and result by the action of tetrazodiphenyl and tetrazoditolyl on resorcin.

In carrying out my invention I first prepare a solution of the hydrochloride of tetrazodiphenyl by mixing 28.2 pounds sulphate of benzidine, twenty-five pounds muriatic acid of 20° Baumé, and five hundred pounds of water, and adding to this mixture a solution of fourteen pounds of nitrite of soda in fifty pounds of water.

Care must be taken to keep the mixture cool during the operation, the end of which is indicated by the dissolving of the sulphate of benzidine.

The so-prepared solution of the hydrochloride of tetrazodiphenyl is then allowed to run slowly into a cold solution of twenty-two pounds of resorcin and twenty-six pounds of dry soda in five hundred pounds of water. The coloring-matter is formed at once in the shape of brown-red crystalline flakes, and may be prepared for commerce by filtering, pressing, and drying.

By substituting in the above process thirty-one pounds of sulphate of tolidine for 28.2 pounds of sulphate of benzidine without changing in any regard the turn of the operations or the weights of the other substances employed, a similar dye-stuff is produced differing from the described only by a more bluish shade.

The chief characteristics of the coloring-matters prepared by the above process are as follows: The appearance is that of a dark reddish-brown crystalline powder, rather difficultly soluble in water, with a brown-red color, which is changed by the addition of caustic soda to the watery solution into a crimson shade, while mineral acids precipitate the dye-stuff in form of brown flakes. They show a striking affinity, like other azo coloring-matters, for the raw-cotton fiber, which may be dyed by them without employing any mordant.

I claim as new and desire to secure by Letters Patent—

1. The within-described process of manufacturing a red azo dye-stuff, consisting in subjecting an alkaline solution of resorcin to the action of tetrazodiphenyl-chlorid or tetrazoditolylchlorid, as herein set forth.

2. The red azo dye-stuff herein described, consisting of a dark reddish-brown powder which dissolves difficultly in water, the solution of which turns crimson by the addition of caustic soda, and which has also the property of being fixable without a mordant.

In testimony whereof I have signed my name to this specification in the presence of two subscribing witnesses.

PAUL FRIEDLAENDER.

Witnesses:
FRANZ WIRTH,
FRANZ HASSLACHER.